(12) United States Patent
Kelso et al.

(10) Patent No.: US 10,417,433 B2
(45) Date of Patent: Sep. 17, 2019

(54) ENCRYPTION AND DECRYPTION OF DATA OWNED BY A GUEST OPERATING SYSTEM

(71) Applicant: Lenovo Enterprise Solutions (Singapore) Pte. Ltd., Singapore (SG)

(72) Inventors: Scott Kelso, Cary, NC (US); Fred A. Bower, III, Durham, NC (US)

(73) Assignee: Lenovo Enterprise Solutions (Singapore) Pte. Ltd., Singapore (SG)

( * ) Notice: Subject to any disclaimer, the term of this patent is extended or adjusted under 35 U.S.C. 154(b) by 238 days.

(21) Appl. No.: 15/413,570

(22) Filed: Jan. 24, 2017

(65) Prior Publication Data
US 2018/0211049 A1    Jul. 26, 2018

(51) Int. Cl.
*G06F 21/00*    (2013.01)
*G06F 21/60*    (2013.01)
*H04L 9/08*    (2006.01)
*H04L 9/32*    (2006.01)

(52) U.S. Cl.
CPC .......... *G06F 21/602* (2013.01); *H04L 9/0897* (2013.01); *H04L 9/3234* (2013.01)

(58) Field of Classification Search
CPC .... G06F 21/602; H04L 9/3234; H04L 9/0897
See application file for complete search history.

(56) References Cited

U.S. PATENT DOCUMENTS

| | | | |
|---|---|---|---|
| 9,189,609 B1 * | 11/2015 | Antony | ............... G06F 9/45558 |
| 9,967,319 B2 | 5/2018 | Savelieva | |
| 9,971,909 B2 | 5/2018 | Mittal | |
| 2002/0051536 A1 | 5/2002 | Shirakawa et al. | |
| 2004/0255199 A1 | 12/2004 | Yamashita | |
| 2005/0105738 A1 | 5/2005 | Hashimoto | |
| 2005/0289397 A1 | 12/2005 | Haruki et al. | |
| 2006/0005260 A1 | 1/2006 | Haruki et al. | |
| 2006/0010308 A1 | 1/2006 | Haruki et al. | |
| 2006/0262928 A1 | 11/2006 | Bar-El et al. | |
| 2007/0043978 A1 | 2/2007 | Cruzado et al. | |
| 2008/0046581 A1 * | 2/2008 | Molina | ................... H04L 63/08 709/229 |
| 2008/0114989 A1 | 5/2008 | Anbalagan et al. | |

(Continued)

OTHER PUBLICATIONS

King et al, Operating System Support for Virtual Machines, ACM, 14 Pages Jun. 2003 (Year: 2003).*

*Primary Examiner* — Christopher C Harris
(74) *Attorney, Agent, or Firm* — Jeffrey L. Streets

(57) ABSTRACT

An apparatus includes one or more processor core, trusted key store, memory controller, and a memory module. The memory controller includes an encryption/decryption module that encrypts data being stored to the memory module for a guest OS being executed by the processor core(s) and that decrypts data being read from the memory module for the guest OS. Data owned by the guest OS is encrypted and decrypted by the encryption/decryption module using an encryption key stored by the trusted key store in association with the guest OS. A method encrypts data owned by the guest OS using the encryption key assigned to the guest OS and stores the encrypted data on a memory module, wherein the encrypted data is stored in association with the process identifier of the guest OS, and decrypts the encrypted data using the guest OS encryption key and provides the decrypted data to the guest OS.

18 Claims, 4 Drawing Sheets

(56) References Cited

U.S. PATENT DOCUMENTS

| | | | |
|---|---|---|---|
| 2010/0082991 A1* | 4/2010 | Baldwin | H04L 9/083 |
| | | | 713/176 |
| 2010/0281273 A1* | 11/2010 | Lee | G06F 21/72 |
| | | | 713/190 |
| 2011/0167278 A1 | 7/2011 | Goto et al. | |
| 2011/0302400 A1* | 12/2011 | Maino | G06F 21/575 |
| | | | 713/2 |
| 2012/0209812 A1* | 8/2012 | Bezbaruah | G06F 9/45558 |
| | | | 707/646 |
| 2013/0191649 A1 | 7/2013 | Muff et al. | |
| 2013/0191651 A1 | 7/2013 | Muff et al. | |
| 2014/0037093 A1 | 2/2014 | Park et al. | |
| 2014/0089667 A1 | 3/2014 | Arthur, Jr. et al. | |
| 2016/0188452 A1* | 6/2016 | Almasi | G06F 12/0646 |
| | | | 711/6 |
| 2016/0292085 A1* | 10/2016 | Axnix | G06F 21/575 |
| 2016/0378522 A1* | 12/2016 | Kaplan | G06F 12/1408 |
| | | | 718/1 |
| 2017/0244557 A1* | 8/2017 | Riel | G06F 9/45558 |
| 2017/0277898 A1* | 9/2017 | Powell | G06F 21/602 |
| 2018/0048470 A1 | 2/2018 | Bower | |
| 2018/0095899 A1* | 4/2018 | Durham | G06F 12/0831 |
| 2018/0196827 A1 | 7/2018 | Sundaram et al. | |
| 2018/0204025 A1 | 7/2018 | Chhabra et al. | |

\* cited by examiner

ENCRYPTION AND DECRYPTION OF DATA OWNED BY A GUEST OPERATING SYSTEM

BACKGROUND

The present disclosure relates to systems and methods of maintaining security of guest operating system data from a host operating system in a multi-tenant cloud environment.

BACKGROUND OF THE RELATED ART

In a hosted workload environment, where multiple workloads may share the same processor simultaneously, all workloads have to grant trust to the host. This is due to the fact that the host operating system and other similar software (such as debuggers and other hardware analysis tools) can inspect all detailed processor state data. However, in a multi-tenant environment, such as a public cloud infrastructure-as-a-service (IaaS) implementation, there is a potential lack of security or trust problem in that the host operating system may be able to read data belonging to a guest operating system.

BRIEF SUMMARY

One embodiment provides an apparatus comprising one or more processor cores, a trusted key store operatively coupled to the one or more processor cores, a memory controller operatively coupled to the one or more processor cores and the trusted key store, and a memory module operatively coupled to the memory controller. Furthermore, the memory controller includes an encryption and decryption module that encrypts data being stored to the memory module for a guest operating system being executed by the one or more processor cores and that decrypts data being read from the memory module for the guest operating system, wherein data and instructions owned by the guest operating system are encrypted and decrypted by the encryption and decryption module using an encryption key stored by the trusted key store in association with the guest operating system.

Another embodiment provides a method comprising executing a host operating system and a guest operating system on one or more processor cores, and storing a process identifier assigned to the guest operating system in association with an encryption key received from the guest operating system in a trusted key store, wherein the encryption key received from the guest operating system is not accessible to the host operating system. The method further comprises encrypting data owned by the guest operating system using the encryption key received from the guest operating system and storing the encrypted data on a memory module in response to a write command from the guest operating system, wherein the encrypted data is stored on the memory module in association with the process identifier of the guest operating system, and decrypting encrypted data owned by the guest operating system using the encryption key received from the guest operating system and providing the decrypted data to the guest operating system in response to a read command from the guest operating system.

DETAILED DESCRIPTION

Figure 1:
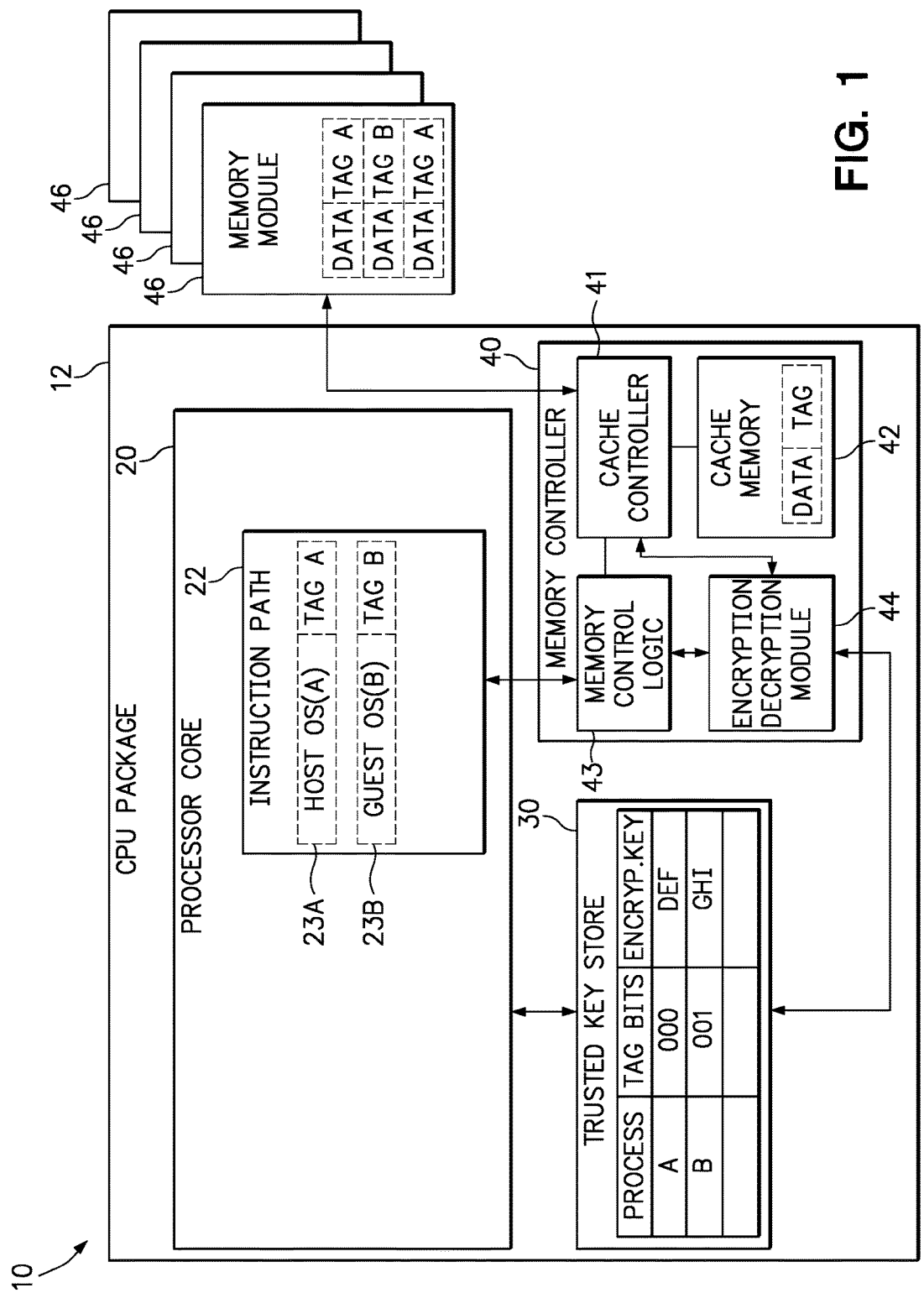
FIG. 1 is a diagram of an apparatus including a CPU package that has a trusted key store according to one embodiment.

One embodiment provides an apparatus comprising one or more processor cores, a trusted key store operatively coupled to the one or more processor cores, a memory controller operatively coupled to the one or more processor cores and the trusted key store, and a memory module operatively coupled to the memory controller. Furthermore, the memory controller includes an encryption and decryption module that encrypts data being stored to the memory module for a guest operating system being executed by the one or more processor cores and that decrypts data being read from the memory module for the guest operating system, wherein data and instructions owned by the guest operating system are encrypted and decrypted by the encryption and decryption module using an encryption key stored by the trusted key store in association with the guest operating system.

The trusted key store may take the form of a trusted platform module (TPM), which is a dedicated microcontroller. Accordingly, the trusted platform module may interface with one or more encryption and decryption modules to provide the encryption key associated with the guest operating system. Preferably, the guest operating system will be assigned a process identifier and the encryption key will be stored in association with that process identifier. Optionally, the trusted platform module and the one or more processor cores may be located on the same chip.

The encryption key may be assigned to the guest operating system by the encryption and decryption module or by the trusted key store upon initial execution of the guest operating system in the one or more processor cores. Regardless of which entity generates or assigns the encryption key, the encryption key is stored in the trusted key store in association with a process identifier, such as a tag. In order to establish a private execution domain between the guest and the CPU itself, a secure trust domain may be constructed before this tag assignment can be made.

In a preferred embodiment, the guest operating system is delivered to the host processor in an encrypted form and the guest exchanges a key with the host processor via any preferred method for secret exchange using cryptography, so long as the key exchange maintains protection against so-called "man-in-the-middle" attacks. For example, unencrypted initialization code that initializes the key exchange can be delivered from the guest to the host such that the initialization code can be executed on the host processor to perform an exchange of public keys between the guest and the host. The execution of this initialization code can be measured by a host device, such as a TPM, to establish that the initialization code has not been altered by another piece of host software that has access to the processor and instruction memory. In this initialization process, the host processor presents a digital certificate that has been signed by a certificate authority that has established trust to all involved parties. This digital certificate includes the host's public key for encryption of messages to the one or more processor cores. The guest then presents its own public encryption key to the host so that the guest and host may then perform a secure exchange, for example using an algorithm such as Diffie-Hellman. Once the one or more processor cores have assigned a process tag to the guest and has shared the guest's process tag with the guest via this secure channel, the guest can supply the one or more processor cores with a symmetric encryption key for the encrypted portion of the workload and secure processing can commence. The guest's symmetric encryption key is then stored in the trusted key store in association with the process tag assigned to the guest, such that the host processor can subsequently encrypt and decrypt data and instructions on behalf of the guest.

In secure processing according to the present embodiment, when data is being written to the memory module on behalf of the guest operating system, the encryption and decryption module may receive a write command and the process identifier for the guest operating system, provide the process identifier to the trusted key store in a request for the encryption key associated with the process identifier, then use the encryption key provided by the trusted key store to encrypt the data prior to storage of the encrypted data and the process identifier on the memory module.

The apparatus may further include cache memory in the communication path between the memory controller and the memory module, wherein all data stored on the cache memory is encrypted using the encryption key associated with the guest operating system that owns the data. Accordingly, the data received by the cache memory is already encrypted, such that data exchanged between the cache memory and the memory module remains encrypted in either direction. The encryption and decryption module is responsible for encrypting data that is being stored in either the cache memory or the memory module and for decrypting data that is being provided to the processor from either the cache memory or the memory module. In this manner, the data owned by the guest operating system is secured by encryption wherever the data is stored beyond the one or more processor cores. The cache may be any one or more cache of any type or level, such as a level three cache.

In another embodiment of the apparatus, the one or more processor cores may include data registers and an encryption and decryption module that encrypts data being stored to the data registers for a guest operating system being executed by the one or more processor cores and that decrypts data being read from the data registers for the guest operating system. The data stored on the data registers that is owned by the guest operating system may be encrypted and decrypted by the encryption and decryption module of the one or more processor cores using the encryption key stored by the trusted key store in association with the process tag assigned to the guest operating system. Accordingly, even the data stored in a data register within the one or more processor cores may be secured by encryption, such that a host operating system or other process being executed by the one or more processor cores will not be able to successfully read the data.

Another embodiment provides a method comprising executing a host operating system and a guest operating system on one or more processor cores of a central processing unit package, and storing a process identifier assigned to the guest operating system in association with an encryption key received from the guest operating system in a trusted key store, wherein the encryption key received from the guest operating system is not accessible to the host operating system. The method further comprises encrypting data owned by the guest operating system using the encryption key received from the guest operating system and storing the encrypted data on a memory module in response to a write command from the guest operating system, wherein the encrypted data is stored on the memory module in association with the process identifier of the guest operating system, and decrypting encrypted data owned by the guest operating system using the encryption key received from the guest operating system and providing the decrypted data to the guest operating system in response to a read command from the guest operating system.

The method may further include verifying that the read command is from the guest operating system (or other guest process). For example, verifying that the read command is from the guest operating system may include determining that the read command includes a process identifier that matches the process identifier stored on the memory module in association with the encrypted data and that the read command comes from an instruction stream (or "workload") authenticated as belonging to the guest operating system via the successful decryption of that guest operating system instruction stream using its previously-shared encryption key. Accordingly, if a read command is received from a process having a process identifier that does not match the process identifier stored in the memory module along with the requested portion of the encrypted data, or if the instructions packaged with the identifier are not encrypted with the encryption key for the workload associated with the identifier, then the encryption and decryption module may not decrypt the requested portion of the encrypted data. Only a process, such as the guest operating system, that owns data stored on the memory module will be able to have that data decrypted. As described herein, ownership of data is shown by having a process identifier that matches the process identifier stored in association with the encrypted data and having instructions that have a trusted chain of provenance from the owning (guest) process. For example, the trusted chain of provenance (or history of ownership by a process) may be provided by embodiments herein that do not allow for tampering with the instructions stream associated with the given process identifier and its encryption keys within the processor.

Optionally, the process identifier may be a plurality of tag bits. In a preferred embodiment, the host CPU package associates the tag bits that identify a guest operating system with all processor instructions of the guest operating system, the encryption key(s) of the guest operating system, and all data owned by the guest operating system. In a further option, data owned by the guest operating system includes data owned by any application being run on the guest operating system, such that the guest operating system and applications being run by the guest operating system may share data that is not accessible to the host operating system.

The method may further include steps to secure data stored within the central processing package, such as data stored in a data register. For example, the method may further include encrypting data owned by the guest operating system using the encryption key associated with the guest operating system and storing the encrypted data on a data register of the central processing unit package, wherein the encrypted data is stored on the data register in association with the process identifier assigned to the guest operating system. The method may also include decrypting encrypted data stored on the data register and owned by the guest operating system using the encryption key associated with the guest operating system and providing the decrypted data to the guest operating system.

Embodiments disclosed herein enable a guest operating system to secure its data in storage, in memory, and/or in transit to and from the processor. The processor may have a mode for running guest operating system code that decrypts memory content inbound to the processor, and encrypts outbound content. The guest operating system mode also prevents the host operating system from reading the virtualized CPU state of the guest operating system as it is being executed on the host CPU package.

The processor may have its own secure channel to a trusted platform module (TPM), which may be integrated inside the processor. When a guest operating system is launched, the processor enters guest operating system mode and retrieves from the TPM the encryption/decryption key associated with the launched guest. Guest operating system mode may also be implemented per-core, with a processor core or groups of processor cores assigned to different security domains for each guest operating system. Any processor core running the host operating system or hypervisor would not have access to the encryption key for the guest operating system, and thus would not be able to see inside the memory or CPU state of the guest operating system being executed on the host CPU package.

One embodiment provides a CPU package comprising a first processor core forming an instruction path, a data register that is externally accessible through a debug port, a first encryption and decryption module disposed in a communication path between the instruction path and the data register, and a key store accessible to the first encryption and decryption module. The first encryption and decryption module encrypts and stores data in the data register for each of a plurality of processes being handled in the instruction path, wherein data owned by each process is encrypted and decrypted by the first encryption and decryption module using an encryption key associated with the process. Furthermore, the key store will store the encryption key associated with each of a plurality of processes, wherein the key store is inaccessible outside the CPU package.

Optionally, the first encryption and decryption module may also receive and store an encryption key for each of the plurality of processes being handled in the instruction path. In a separate option, the data register or other data structure may store the encrypted data along with a process identifier or tag assigned to the process that owns the data. Still further, each process identifier may be assigned to a guest process by a host operating system that is running on the CPU package.

In a further embodiment, the CPU package may further comprise a memory controller including cache memory, and a second encryption and decryption module disposed in a communication path between the first processor core and the cache memory. The second encryption and decryption module may encrypt and store data in the cache memory for each of a plurality of processes being handled in the instruction path, wherein data owned by each process is encrypted and decrypted by the second encryption and decryption module using an encryption key associated with the process, wherein the second encryption and decryption module has access to the key store.

In a still further embodiment, the CPU package may comprise a memory controller including cache memory, and a second encryption and decryption module disposed in a communication path between the first processor core and the cache memory, wherein the second encryption and decryption module encrypts and stores data in the cache memory for each of a plurality of processes being handled in the instruction path, wherein data owned by each process is encrypted and decrypted by the second encryption and decryption module using an encryption key associated with the process. However, the CPU package may further comprise a second key store that is accessible to the second encryption and decryption module and may store the encryption key associated with each of the plurality of processes, wherein the second key store is inaccessible outside the CPU package. Optionally, the first and second key stores may store a different encryption key for each of the plurality of processes. The CPU package may further comprise a second processor core, wherein the first and second processor cores share a single key store.

Still further, the CPU package may further comprise a plurality of externally accessible data structures, and a plurality of encryption and decryption modules, each encryption and decryption module controlling data into and out of one of the externally accessible data structures.

Another embodiment provides a method comprising a CPU package executing a plurality of processes, wherein each process is assigned a process identifier, storing an encryption key for each of the plurality of processes, and storing, for each of the processes, the process identifier assigned to the process in association with the encryption key for the process in a key store that is not accessible outside the CPU package. The method further comprises encrypting, for one or more of the processes, processor state data owned by a process using the encryption key associated with the process and storing the encrypted processor state data and the process identifier in an externally accessible processor data structure, and decrypting a requested portion of the encrypted processor state data stored in the processor data structure and providing the decrypted processor state data to a requesting process in response to receiving a read request from the requesting process having a process identifier that matches the process identifier stored in the processor data structure along with the requested processor state data.

In one embodiment, the host operating system may be certified as trustworthy by all participating processes via trusted execution measurements, digital signing of the operating system code, and protection of the operating system structures via privileged execution isolation, such that participating processes cannot compromise the shared operating system resources that establish and maintain the secure execution environments for participating processes.

The method may further comprise preventing decryption of a requested portion of the encrypted processor state data stored in the processor data structure in response to receiving a read request from the requesting process having a process identifier that does not match the process identifier stored in the processor data structure along with the requested processor state data.

The externally accessible processor data structure may, for example, be selected from the group consisting of a buffer, register, cache memory and combinations thereof. In one option, all externally accessible processor state data that is stored within the CPU package is encrypted with an encryption key that is specific to the process that owns the data. In another option, the externally accessible processor data structure is accessible to an external debugger application through a debugger port.

In a further embodiment, the method may further comprise a selected process, from among the one or more processes, granting access to data owned by the selected process to a second process by allowing the second process to use the process identifier of the selected process. For example, the second process may be a debugger process or a shared library. Still further, the step of the selected process granting access to data owned by the selected process to a second process, may include the operating system automatically associating the process identifier of the selected process with the second process in response to the selected process calling the second process.

In another embodiment, the method may further comprise detecting that an external entity located outside of the CPU package is attempting to access the externally accessible data structure, and determining whether the external entity has a process identifier that matches the process identifier stored along with the data being accessed. For example, the external entity may be a debugger application running on a different computer that is externally connected to the CPU package through a debug header. The method may optionally include exporting the process identifier from a process that is to be debugged to the debugger application. This exporting would typically be done via an encrypted exchange such as described previously, perhaps using Diffie-Hellman or a similar method to prevent man-in-the-middle interception of the process identifier or so-called replay attacks.

In yet another embodiment, the process identifier may be represented by a plurality of tag bits. Accordingly, the method may include the CPU package associating the tag bits of a process with all instructions of the process and all data owned by the process. One method may use the tag bits associated with an instruction as an index into the key store, and use the encryption key that is stored in the key store in association with the tag bits to decrypt the data in the processor data structure. Still further, the method may use the tag bits associated with an instruction as an index into the key store to retrieve the associated encryption key from the trusted key store, and use the encryption key that is stored in the key store in association with the tag bits to encrypt data owned by a process that includes the instruction.

In a further embodiment, the method may further comprise the CPU package determining that a process is a new process in response to handling a process with a process identifier that is not found in the key store or other table of active processes. The method may then assign a key-tag pair to the new process, wherein the key-tag pair is unique among other active processes, and store the key-tag pair in the key store. Optionally, in systems where the assignment and storage of key-tag pairs is controlled by the trusted operating system code, a key-tag pair may be reused or reassigned to new process after the key-tag pair is no longer in use by any other active process.

The disclosed embodiments may prevent unauthorized access to processor state data on a per-process basis. All data stored within a CPU is associated with an encryption key that is specific to the process that generated the data. Any movement of data onto or off of an externally readable data structure of the CPU will result in an encryption or decryption action, respectively. Externally readable processor data structures include, for example, buffers, registers and cache memory.

For example, data stored in registers that can be read by a debugger process is encrypted. If the CPU needs access to the data stored in those registers, the data must be decrypted. If a debugger process attempts access to the data stored in those registers, the debugger process would obtain either the encrypted data or a redacted representation of the register state (i.e. an indication that the register is unreadable because of permission deficiency). The tenant or guest process that owns the data may, optionally, grant trust to the debugger process or other cooperating trusted process, such as a shared library, on a case by case basis. When the tenant process grants trust to another process, that other process may receive decrypted data owned by the tenant process. However, a grant of trust from the tenant process only extends to the data that is owned by the tenant process. In other words, a grant of trust from a tenant process (the "grantor") to another process (the "grantee") can convey an access privilege no broader than the access privilege of the tenant process.

As data and instructions traverse the CPU pipeline data path within the CPU package, the CPU tracks the identity of the process (i.e., via process ownership tag bits) that owns the data and the instructions. If a process has permission to access certain data, then the CPU executes logic to decrypt the data for the process. A process identifier, such a set of tag bits, associated with a process that is attempting access to the encrypted data is used as an index into a key store that is present on the host CPU and not accessible to entities outside the CPU. The key store maintains a list of active processes and, for each active process, an associated tag (i.e., tag bits) and a unique encryption key.

In order to encrypt data from a process or decrypt data requested by a process, the encryption and decryption module uses the process identifier associated with the process to retrieve the associated encryption key from the trusted key store. The encryption and decryption module then uses the process-specific encryption key to encrypt data being stored or decrypt data being read by a process having the associated process identifier. When storing data to the data storage structure, the encryption and decryption module encrypts the data using the process-specific encryption key and delivers the encrypted data to the data storage structure for storage. When retrieving data from the data storage structure, the encryption and decryption module uses the process-specific encryption key to decrypt the data being accessed and delivers the decrypted data to the requesting process, subject to the requesting process having a process identifier that is the same as the process identifier of the process that stored the data. In other words, only the process that owns the data or a process that has received permission form the process that owns the data will be able to access the data.

In one embodiment, the encryption and decryption module may implement a redacting mechanism, for example in which no data is provided to an externally readable data structure unless the requesting process or entity has been authenticated by having a process identifier that matches the process identifier associated with the requested data. If the requesting process or entity can provide evidence of authenticity (i.e., the matching process identifier), then the encryption and decryption module may decrypt the requested data and provide the decrypted data to the requesting process or entity. However, if the requesting process or entity cannot provide evidence of authenticity, then the externally readable data structure would have its data nullified and the encryption and decryption module would simply disallow transfer from the chip-internal storage element to the externally readable location.

In one option, all external chip data accesses may utilize a challenge-response using an encrypted exchange of information to validate the authenticity of the requesting element. In the case of a shared library, this challenge-response mechanism may be used to ensure that the instance of the library acting on behalf of a given process is only able to see data for that process. For example, the CPU package may support process identifier inheritance (or process tag bit inheritance) by the shared library or other linked process, such that the shared library may only assume the identity of the process that is using the shared library in a given thread of execution. When code from the shared library is loaded, the OS kernel may dynamically tag or associate the process identifier of the executing process with the shared library code. For example, this tagging of a dynamic instruction stream may occur in a fetch unit of the processor, after the instruction is pulled from the instruction cache.

Process and thread identity is preferably assigned by the operating system (OS) and may be conveyed to the CPU package by the OS kernel. For example, process identity may take the form of a tag that is unique among active processes, such as a series of tag bits. In one option, a process is assigned a tag that is used to keep processes from having access to each other's memory, and this same tag could be used further as an index into the key store for protecting processor state data from being accessed by other processes. However, since some processes may have privileged access to all memory, reusing such a tag might allow those processes to gain access to the encrypted data of other processes. In a further option, the OS kernel may assign a separate tag to each process for the purpose of protecting processor state data from being accessed by other processes.

A process may grant trust to another process or entity using any known method of granting trust. For example, a granting process may give a "secret" to a second process that proves trust was established. The second process (the grantee) may then present the secret (preferably including elements of identifying information that could not be forged) to allow the second process to impersonate the granting process for access to processor state data. In one example, the "secret" may be a password. Accordingly, the "secret" may be used to authenticate a process rather than the process identifier, although the "secret" may be used in the same manner described for the process identifier.

In order to validate authenticity of a requesting entity, a "challenge-response" process may be used between the requesting entity (i.e., the process that is requesting data) and owning entity (i.e., the process that owns the data). For example, a secret (such as a password) may be used the owner process (or arbiter process, such as the OS kernel) to securely transmit a challenge to the requesting process, whereupon the requesting process must return a response with an encrypted value that is some predetermined function of the originally offered information, thus proving that it was able to decrypt the challenge. For instance, in the computer network authentication protocol known as Kerberos, the challenge is an encrypted integer N, while the response is the encrypted integer N+1, proving that the other end was able to decrypt the integer N. In other variations, a hash function operates on a password and a random challenge value to create a response value.

Optionally, the OS kernel may act as arbiter of such data access requests, possibly including use of a Trusted Platform Module (TPM) which can be used for secure storage of encryption keys. All of the storage locations are matters of preferred embodiments, wherein the key store within the CPU package never externalizes its encryption keys.

A single CPU package may include multiple processor cores that may share a single encryption key store for that CPU package. However, in a compute node having multiple CPU packages, a process may run on both packages and has the same need for data protection. Optionally, the process may be separately registered with each CPU package, such that the process has a separate process identifier or tag and encryption key on each CPU package. Therefore, the process is independently protected on each CPU package. Accordingly, the process is authorized to access its own data on each CPU package, but uses different encryption keys on each CPU package in a manner that is transparent to the process.

Embodiments may include a memory controller with a security mechanism for protecting data, where the security mechanism is analogous to that disclosed for the processor state data within the one or more processor cores. Accordingly, the memory controller may have its own encryption and decryption module, and have access to a second key store storing tag-key pairs for use by the memory controller. Optionally, a process identifier or tag that has been assigned to the process by the OS kernel may be reused in the memory controller, although the process identifier or tag may be associated with a different encryption key. Optionally, the memory controller may have its own encryption staging buffer and logic module, but utilize the same key store used by the one or more processor cores.

Various embodiments or various aspects of one or more of the embodiments may take the form of a computer program product comprising computer readable storage media that is not a transitory signal having program instructions embodied therewith, wherein the program instructions are executable by a processor to perform a disclosed method. A separate description of the methods will not be duplicated in the context of a computer program product.

FIG. 1 is a diagram of an apparatus 10 including a CPU package 12 including a first processor core 20 forming an instruction path 22. The CPU package 12 also includes a trusted key store 30 operatively coupled to, and accessible by, the first processor core 20. The instruction path 22 of the processor core 20 is shown schematically to be running a Host Operating System "A" (23A) and a Guest Operating System "B" (23B), but any number of operating systems and other processes may be handled in accordance with one of the disclosed embodiments.

The apparatus further includes a memory controller 40 that is operatively coupled to the processor core 20 for receiving read instructions and write instructions from the processor core 20. In the embodiment shown, the memory controller 40 includes memory control logic 43, a cache controller 41, cache memory 42, and an encryption and decryption module 44. The encryption and decryption module 44 may encrypt and store data in memory, such as in the cache memory 42 or the memory modules 46, for either the host OS 32A or the Guest OS 23B. Data owned by either operating system is encrypted and decrypted by the second encryption and decryption module 44 using the encryption key assigned to that operating system. The encryption and decryption module 44 is operatively coupled to the trusted key store 30 and may obtain the encryption key associated with which ever operating system is requesting a read or write action. As shown, the trusted key store 30 is illustrated as a data table including a plurality of records (rows), wherein each row includes a process identifier, tag bits and an encryption key. However, the key store may store the data in any suitable format other than a table. In this example, the process identifier identifies one of the operating systems, but in other embodiments may be used to identify other processes or applications.

As shown in FIG. 1, Process A (23A) has been assigned a process identifier in the form of a tag (Tag A) and Process B (23B) has been assigned a process identifier in the form of a tag (Tag B). Accordingly, instructions traversing the instruction path 22 and data being stored in the cache memory 42 or memory modules 46 is appended or accompanied by the tag corresponding to the process that owns the instruction or data. In this manner, a process that owns encrypted data stored in the cache memory 42 or memory modules 46 will have permission for the encryption and decryption module 26 to decrypt and provide that data to the process. Only a process that has a tag matching the tag associated with the data in the registers will be able to obtain the data. Any type or number of memory devices may be managed in this manner.

Figure 2:
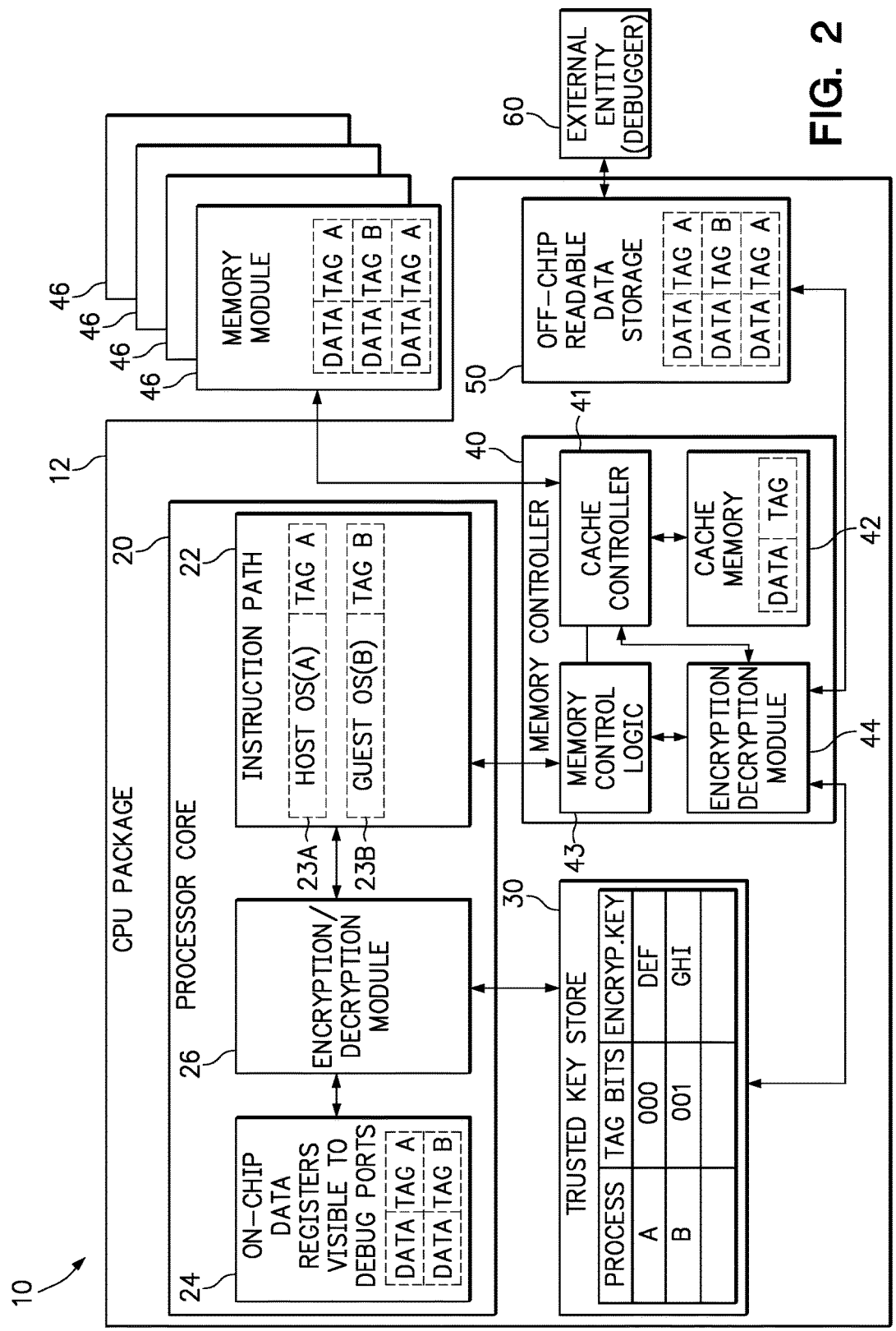
FIG. 2 is diagram of an apparatus including a CPU package according to another embodiment.

FIG. 2 is a diagram of an apparatus 10 including a CPU package 12 with a first processor core 20 forming an instruction path 22, data registers 24 that may be externally accessible through a debug port, and an encryption and decryption module 26 disposed in a communication path between the instruction path 22 and the data registers 24. The CPU package also includes a key store 30 operatively coupled to, and accessible by, the encryption and decryption module 26. The encryption and decryption module 26 may encrypt and store data in the data registers 24 for each of a plurality of processes being handled in the instruction path. For example, the plurality of processes are shown schematically to include a Host OS "A" (23A) and a Guest OS "B" (23B), but any number of operating systems and processes may be handled in accordance with various embodiments. Data owned by each operating system is encrypted and decrypted by the encryption and decryption module 26 using an encryption key assigned to the operating system. Furthermore, the key store 30 may store the encryption key assigned to each of the operating systems and perhaps other processes, wherein the key store is inaccessible outside the CPU package 12. As shown, the key store 30 is illustrated as a data table including a plurality of records (rows), wherein each row includes a process identifier, tag bits and an encryption key. However, the key store may store the data in any suitable format other than a table.

Optionally, the encryption and decryption module 26 may also assign an encryption key to each of the plurality of operating systems and other processes being handled in the instruction path 22. The data registers 24 or other data structures may store the encrypted data along with a process identifier or tag assigned to the process that owns the data. Still further, each process identifier may be assigned to a process by the trusted key store, which may be a trusted platform module.

In a further embodiment, the CPU package 12 further comprises a memory controller 40 including memory control logic 43, a cache controller 41, cache memory 42, and an encryption and decryption module 44. The encryption and decryption module 44 may encrypt and store data in the cache memory 42 and/or the memory modules 46 for each of the operating systems being handled in the instruction path 22, wherein data owned by each operating system is encrypted and decrypted by the encryption and decryption module 44 using the encryption key assigned to that operating system. The encryption and decryption module 44 has access to the key store 30 and may obtain the encryption key necessary to use on behalf of the operating system requesting a read or write from the cache memory 42 or a memory module 46. The encryption and decryption module 44 may encrypt and decrypt data to and from the cache memory 42 and the memory modules 46 in the same or similar manner as the encryption and decryption module 26 encrypts and decrypts data to and from the registers 24.

Still further, the CPU package may further include other externally accessible data structures, such as the off-chip readable data storage 50, and an encryption and decryption module controlling data into and out of each of the externally accessible data structures. While each externally accessible data structure may have its own encryption and decryption module, the illustration shows the encryption and decryption module 44 controlling data in and out of both the cache memory 42, the memory modules 46 and the off-chip readable data storage 50.

As shown in FIG. 2, Host OS "A" (23A) has been assigned a process identifier in the form of a tag (Tag A) and Guest OS "B" (23B) has been assigned a process identifier in the form of a tag (Tag B). Accordingly, instructions traversing the instruction path 22 and data being stored in the data registers 24 are appended or accompanied by the tag corresponding to the operating system that owns the instruction or data. In this manner, an operating system or other process that owns encrypted data stored in the data registers 24 will have permission for the encryption and decryption module 26 to decrypt and provide that data to the process. Only an operating system or other process that has a tag matching the tag associated with the data in the registers/memory will be able to obtain the data. Any number of data registers and memory structures may be controlled in this manner.

Still further, an external entity 60, such as a debugger, is shown in communication with the data storage structure 50. If the external entity attempts to reach a particular portion of the data in the data storage structure 50 and if the external entity is authenticated by presenting the tag associated with the requested data, then the encryption and decryption module 44 will decrypt the requested data and provide the data to the external entity 60. However, if the external entity 60 does not present a tag matching the tag associated with the requested data, then the encryption and decryption module 44 will not decrypt the requested data. In accordance with the embodiment of FIG. 2, the host operating system is unable to obtain data that is owned by the guest operating system.

Figure 3:
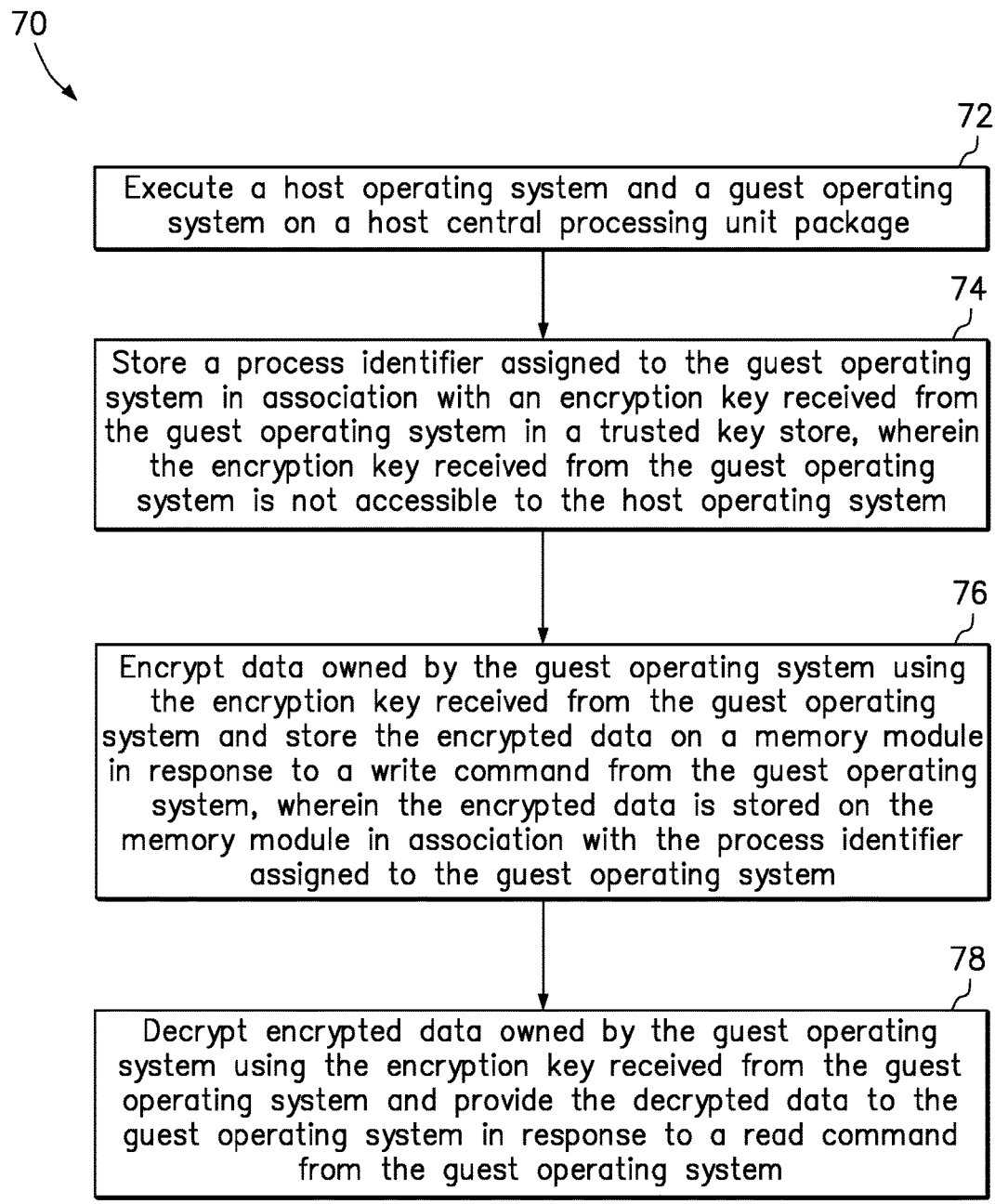
FIG. 3 is a flowchart of a method according to one embodiment.

FIG. 3 is a flowchart of a method 70 according to one embodiment. In step 72, the method executes a host operating system and a guest operating system on a host central processing unit package. In step 74, the method stores a process identifier assigned to the guest operating system in association with an encryption key received from (or assigned to) the guest operating system in a trusted key store, wherein the encryption key received from the guest operating system is not accessible to the host operating system. Step 76 encrypts data owned by the guest operating system using the encryption key received from (or assigned to) the guest operating system and storing the encrypted data on a memory module in response to a write command from the guest operating system, wherein the encrypted data is stored on the memory module in association with the process identifier assigned to the guest operating system. Then, step 78 includes decrypting encrypted data owned by the guest operating system using the encryption key received from (or assigned to) with the guest operating system and providing the decrypted data to the guest operating system in response to a read command from the guest operating system.

Figure 4:
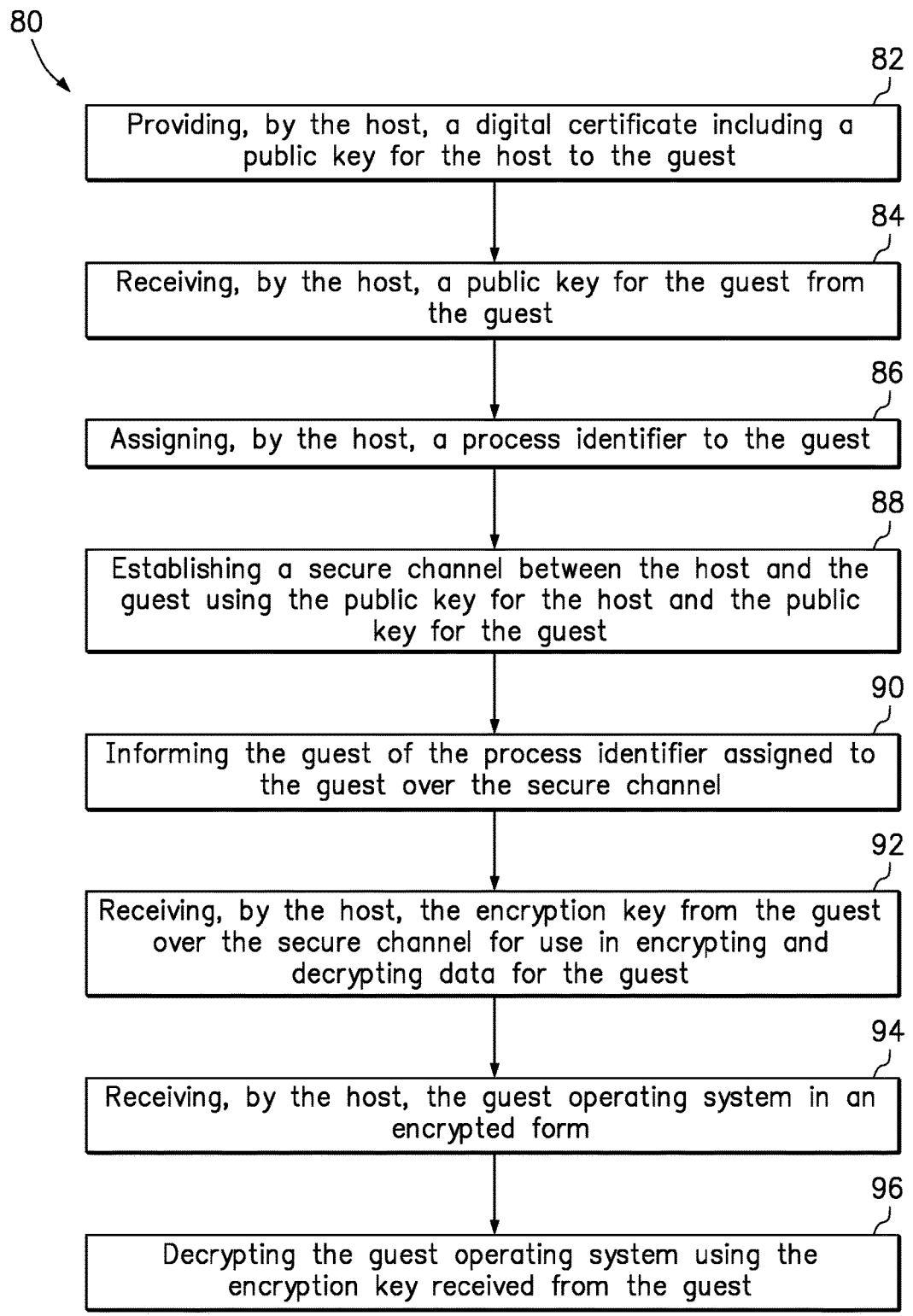
FIG. 4 is a flowchart of a method according to another embodiment.

FIG. 4 is a flowchart of a method 80 according to another embodiment. The method 80 may be considered an initialization process, which may occur prior to the steps of method 70. In step 82, the method includes providing, by the host, a digital certificate including a public key for the host to the guest. Step 84 includes receiving, by the host, a public key for the guest from the guest. In step 86, the host assigns the process identifier to the guest. In step 88, the method establishes a secure channel between the host and the guest using the public key for the host and the public key for the guest. Accordingly, the method may, in step 90, inform the guest of the process identifier assigned to the guest over the secure channel and, in step 92, receive, by the host, the encryption key from the guest over the secure channel for use in encrypting and decrypting data for the guest. Step 94 includes receiving, by the host, the guest operating system in an encrypted form, and step 96 includes decrypting the guest operating system using the encryption key received from the guest.

As will be appreciated by one skilled in the art, embodiments may take the form of a system, method or computer program product. Accordingly, embodiments may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, embodiments may take the form of a computer program product embodied in one or more computer readable medium(s) having computer readable program code embodied thereon.

Any combination of one or more computer readable storage medium(s) may be utilized. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: a portable computer diskette, a hard disk, a random access memory (RAM), a read-only memory (ROM), an erasable programmable read-only memory (EPROM or Flash memory), a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device. Furthermore, any program instruction or code that is embodied on such computer readable storage media (including forms referred to as volatile memory) that is not a transitory signal are, for the avoidance of doubt, considered "non-transitory".

Program code embodied on a computer readable storage medium may be transmitted using any appropriate medium, including but not limited to wireless, wireline, optical fiber cable, RF, etc., or any suitable combination of the foregoing. Computer program code for carrying out various operations may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Embodiments may be described with reference to flowchart illustrations and/or block diagrams of methods, apparatus (systems) and computer program products. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, and/or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored on computer readable storage media that is not a transitory signal, such that the program instructions can direct a computer, other programmable data processing apparatus, or other devices to function in a particular manner, and such that the program instructions stored in the computer readable storage medium produce an article of manufacture.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to limit the scope of the claims. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, components and/or groups, but do not preclude the presence or addition of one or more other features, integers, steps, operations, elements, components, and/or groups thereof. The terms "preferably," "preferred," "prefer," "optionally," "may," and similar terms are used to indicate that an item, condition or step being referred to is an optional (not required) feature of the embodiment.

The corresponding structures, materials, acts, and equivalents of all means or steps plus function elements in the claims below are intended to include any structure, material, or act for performing the function in combination with other claimed elements as specifically claimed. Embodiments have been presented for purposes of illustration and description, but it is not intended to be exhaustive or limited to the embodiments in the form disclosed. Many modifications and variations will be apparent to those of ordinary skill in the art after reading this disclosure. The disclosed embodiments were chosen and described as non-limiting examples to enable others of ordinary skill in the art to understand these embodiments and other embodiments involving modifications suited to a particular implementation.

What is claimed is:

1. A method, comprising:
executing a host operating system and a guest operating system on one or more processor cores;
providing, by the host operating system, a digital certificate including a public key for the host to the guest operating system;
receiving, by the host operating system, a public key for the guest operating system from the guest operating system;
assigning, by the host operating system, the process identifier to the guest operating system;
establishing a secure channel between the host operating system and the guest operating system using the public key for the host operating system and the public key for the guest operating system;
informing the guest operating system of the process identifier assigned to the guest operating system over the secure channel;
receiving, by the host operating system, an encryption key from the guest operating system over the secure channel for use in encrypting and decrypting data for the guest operating system;
storing the process identifier assigned to the guest operating system in association with the encryption key received from the guest operating system in a trusted key store, wherein the encryption key received from the guest operating system is not accessible to the host operating system;
encrypting data owned by the guest operating system using the encryption key received from the guest operating system and storing the encrypted data on a memory module in response to a write command from the guest operating system, wherein the encrypted data is stored on the memory module in association with the process identifier assigned to the guest operating system; and
decrypting encrypted data owned by the guest operating system using the encryption key received from the guest operating system and providing the decrypted data to the guest operating system in response to a read command from the guest operating system.

2. The method of claim 1, further comprising:
verifying that the read command is from the guest operating system.

3. The method of claim 2, wherein verifying that the read command is from the guest operating system, includes determining that the read command includes a process identifier that matches the process identifier stored on the memory module in association with the encrypted data.

4. The method of claim 2, further comprising:
preventing decryption of a requested portion of the encrypted data stored on the memory module in response to receiving a read request from a process having a process identifier that does not match the process identifier stored in the memory module along with the requested portion of the encrypted data.

5. The method of claim 1, wherein the process identifier is a plurality of tag bits.

6. The method of claim 5, further comprising:
the one or more processor cores associating the tag bits of a process with all instructions of the guest operating system and all data owned by the guest operating system.

7. The method of claim 1, wherein data owned by the guest operating system includes data owned by any application being run on the guest operating system.

8. The method of claim 1, further comprising;
encrypting data owned by the guest operating system using the encryption key received from the guest operating system and storing the encrypted data on a data register of the one or more processor cores, wherein the encrypted data is stored on the data register in association with the process identifier of the guest operating system; and
decrypting encrypted data stored on the data register and owned by the guest operating system using the encryption key received from the guest operating system and providing the decrypted data to the guest operating system.

9. The method of claim 1, further comprising:
receiving, by the host operating system, the guest operating system in an encrypted form; and
decrypting the guest operating system using the encryption key received from the guest operating system.

10. A computer program product comprising a non-volatile computer readable storage medium that is not a transitory signal and non-transitory program instructions embodied therewith, the program instructions executable by a processor to cause the processor to perform operations comprising:
executing a host operating system and a guest operating system on one or more processor core;
providing, by the host operating system, a digital certificate including a public key for the host to the guest operating system; receiving, by the host operating system, a public key for the guest operating system from the guest operating system;
assigning, by the host operating system, the process identifier to the guest operating system;
establishing a secure channel between the host operating system and the guest operating system using the public key for the host operating system and the public key for the guest operating system; informing the guest operating system of the process identifier assigned to the guest operating system over the secure channel;
receiving, by the host operating system, an encryption key from the guest operating system over the secure channel for use in encrypting and decrypting data for the guest operating system;
storing the process identifier assigned to the guest operating system in association with the encryption key received from the guest operating system in a trusted key store, wherein the encryption key received from the guest operating system is not accessible to the host operating system;
encrypting data owned by the guest operating system using the encryption key received from the guest operating system and store the encrypted data on a memory module in response to a write command from the guest operating system, wherein the encrypted data is stored on the memory module in association with the process identifier of the guest operating system; and
decrypting encrypted data owned by the guest operating system using the encryption key received from the guest operating system and provide the decrypted data to the guest operating system in response to a read command from the guest operating system.

11. The computer program product of claim 10, the operations further comprising:
   verifying that the read command is from the guest operating system.

12. The computer program product of claim 11, wherein verifying that the read command is from the guest operating system, includes determining that the read command includes a process identifier that matches the process identifier stored on the memory module in association with the encrypted data.

13. The computer program product of claim 11, the operations further comprising:
   preventing decryption of a requested portion of the encrypted data stored on the memory module in response to receiving a read request from a process having a process identifier that does not match the process identifier stored in the memory module along with the requested portion of the encrypted data.

14. The computer program product of claim 10, wherein the process identifier is a plurality of tag bits.

15. The computer program product of claim 14, the operations further comprising:
   the one or more processor cores associating the tag bits of a process with all instructions of the guest operating system and all data owned by the guest operating system.

16. The computer program product of claim 10, wherein data owned by the guest operating system includes data owned by any application being run on the guest operating system.

17. The computer program product of claim 10, the operations further comprising;
   encrypting data owned by the guest operating system using the encryption key received from the guest operating system and storing the encrypted data on a data register of the one or more processor cores, wherein the encrypted data is stored on the data register in association with the process identifier of the guest operating system; and
   decrypting encrypted data stored on the data register and owned by the guest operating system using the encryption key received from the guest operating system and providing the decrypted data to the guest operating system.

18. The computer program product of claim 10, the operations further comprising:
   receiving, by the host operating system, the guest operating system in an encrypted form; and
   decrypting the guest operating system using the encryption key received from the guest operating system.

* * * * *